(12) United States Patent
Tan

(10) Patent No.: US 9,922,359 B2
(45) Date of Patent: Mar. 20, 2018

(54) THREE-DIMENSIONAL IMAGE SEARCHING USING ACTIVE LABEL TECHNOLOGY

(71) Applicant: Imaginestics, LLC, West Lafayette, IN (US)

(72) Inventor: Jamie Tan, West Lafayette, IN (US)

(73) Assignee: Imaginestics, LLC, West Lafayette, IN (US)

(\*) Notice: Subject to any disclaimer, the term of this patent is extended or adjusted under 35 U.S.C. 154(b) by 406 days.

(21) Appl. No.: 14/676,083

(22) Filed: Apr. 1, 2015

(65) Prior Publication Data

US 2015/0287117 A1 Oct. 8, 2015

Related U.S. Application Data

(60) Provisional application No. 61/977,068, filed on Apr. 8, 2014.

(51) Int. Cl.
G06Q 30/06 (2012.01)
G06Q 10/08 (2012.01)
G06Q 20/20 (2012.01)

(52) U.S. Cl.
CPC ....... G06Q 30/0627 (2013.01); G06Q 10/087 (2013.01); G06Q 30/0623 (2013.01); G06Q 30/0639 (2013.01); G06Q 20/203 (2013.01)

(58) Field of Classification Search
None
See application file for complete search history.

(56) References Cited

U.S. PATENT DOCUMENTS

| 7,356,489 | B2 * | 4/2008 | Illsley | G06Q 30/02 705/26.64 |
| 7,945,484 | B1 * | 5/2011 | Tam | G06Q 30/06 705/26.1 |
| 8,032,427 | B1 * | 10/2011 | Spreen | G06Q 30/02 705/14.49 |
| 8,248,208 | B2 * | 8/2012 | Renfro, Jr. | G06K 19/07707 340/10.1 |

(Continued)

FOREIGN PATENT DOCUMENTS

WO WO-2006/058292 A1 * 6/2006

OTHER PUBLICATIONS

Rosen, M., "Data Visualization in Three Dimensions," ENT, Dec. 9, 1998.*

(Continued)

*Primary Examiner* — Nicholas D Rosen
(74) *Attorney, Agent, or Firm* — Keith Swede

(57) ABSTRACT

A user communication device retrieves shape information from active labels and performs an image based search on the shape files to find locally available acceptable replacement parts. The user communication device may use only the shape files from the active label, or the user communication device may use a combination of images from both the active label and images generated by a user to search for an acceptable replacement part for a faulty system. Using the active label system, the user communication device directly pings replacement parts at local retailers independently of the computer networks operated by the retailers. The user communication device receives back data from replacement parts and provides the user with a list of locally available parts.

14 Claims, 7 Drawing Sheets

(56) References Cited

U.S. PATENT DOCUMENTS

| | | | | |
|---|---|---|---|---|
| 8,326,698 | B1* | 12/2012 | Tam | G06Q 30/06 |
| | | | | 705/26.1 |
| 8,630,918 | B1* | 1/2014 | Krechel | G06Q 10/087 |
| | | | | 705/26.5 |
| 8,949,252 | B2* | 2/2015 | Chittar | G06F 17/3025 |
| | | | | 707/749 |
| 2004/0039661 | A1* | 2/2004 | Fuzell-Casey | G06Q 30/02 |
| | | | | 705/26.81 |
| 2004/0078301 | A1* | 4/2004 | Illsley | G06Q 30/0629 |
| | | | | 705/26.64 |
| 2005/0078109 | A1* | 4/2005 | Mori | G06T 17/20 |
| | | | | 345/419 |
| 2007/0181681 | A1* | 8/2007 | Jain | G06Q 10/087 |
| | | | | 235/385 |
| 2010/0013600 | A1* | 1/2010 | Renfro, Jr. | G06K 19/07707 |
| | | | | 340/10.1 |
| 2011/0314031 | A1* | 12/2011 | Chittar | G06F 17/3025 |
| | | | | 707/749 |
| 2012/0095884 | A1* | 4/2012 | Tanabe | G06Q 10/087 |
| | | | | 705/28 |
| 2014/0244439 | A1* | 8/2014 | Cruz | G06Q 10/20 |
| | | | | 705/26.61 |
| 2014/0305524 | A1* | 10/2014 | Heizer | F17D 5/00 |
| | | | | 137/551 |

OTHER PUBLICATIONS

Doyle, A., "Parts identification; Boeing, FedEx weigh up 'smart' labels," Flight International, Nov. 11, 2003.*

* cited by examiner

THREE-DIMENSIONAL IMAGE SEARCHING USING ACTIVE LABEL TECHNOLOGY

BACKGROUND

The present invention relates to computer search engines, and more particularly, to user communication devices that receive pictorial information from active labels associated with systems and perform image searches based on the provided information.

SUMMARY OF THE INVENTION

The present invention provides a user communication device that performs an image based search using the shape files retrieved from the active labels on a product or from shape files generated from images of the product produced by a user. In one example, the user communication device only uses the shape files provided from the active label while in another example a combination of shape files from both the active label and user images may be used for the search. If the invention is used to search for replacement parts for a faulty system, the user communication device may then use the shape files to search for locally disposed replacement products equipped with active label technology that have matching shape files. Alternatively, the user may use the shape files to search for 3D models from manufacturers that are available for download and that can be printed at local 3D printing stores. Alternatively, if the part to be replaced is equipped with active label then the 3D model may be obtained from the active label and decrypted with a key purchased from a manufacturer.

Also disclosed is a method of searching a database of component parts, including capturing a plurality of images of an object. The capturing is performed by the use of a camera of a mobile electronic device. The images are captured from at least two different angles. The captured images are submitted as a group into a search engine. When the user is requested to provide additional photos, the capturing may be performed by a camera in the user communication device. Each of the images is captured from a different respective angle. The captured images are submitted into a search engine. The database of component parts is searched by use of the search engine. A result of the search is dependent upon each of the captured images and the images provided by the active label of the faulty system.

The invention comprises, in one form thereof, a method for a user to procure a replacement component part to replace a faulty component part, including wirelessly receiving shape information at the user's electronic communication device. The shape information is transmitted from an active label associated with the faulty component part. The shape information is indicative of a physical shape of the faulty component part. An image indicative of the shape information is displayed on the communication device. The communication device is used to query active labels of candidate replacement component parts. The querying is dependent upon the shape information. Replacement component part information is wirelessly received at the user's electronic communication device. The replacement component part information is transmitted from an active label associated with the one of the candidate replacement component parts that matches the shape information. The replacement component part information is indicative of how the user may procure the one of the candidate replacement component parts that matches the shape information.

The invention comprises, in another form thereof, a method of enabling a user to procure a replacement component part to replace a faulty component part of a system. Part information is wirelessly received at the user's electronic communication device. The part information is transmitted from an active label associated with the system. The part information is indicative of a plurality of component parts of the system. An image indicative of the part information is displayed on the communication device. The user is enabled to select a portion of the displayed part information that is associated with the faulty component part. The communication device is used to wirelessly query active labels of candidate replacement component parts for part information associated with the candidate replacement component parts. The part information associated with the candidate replacement component parts and location information associated with the candidate replacement component parts is wirelessly received at the communication device. The part information and location information associated with the candidate replacement component parts is uploaded from the communication device to a community database. The communication device is used to search the community database for part information and location information associated with candidate replacement component parts. At least a portion of the part information and location information in the community database is not contributed to the community database by the communication device.

The invention comprises, in yet another form thereof, a method of providing a user with information about a replacement component part to replace a faulty component part of a system. Part information and location information associated with candidate replacement component parts is received at a community database. A first portion of the part information and location information is transmitted to the community database from the user's communication device. A second portion of the part information and location information is transmitted to the community database from electronic communication devices associated with retail outlets at which the candidate replacement component parts are disposed. The user's communication device is enabled to search the first portion and the second portion of the part information and location information.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 1:
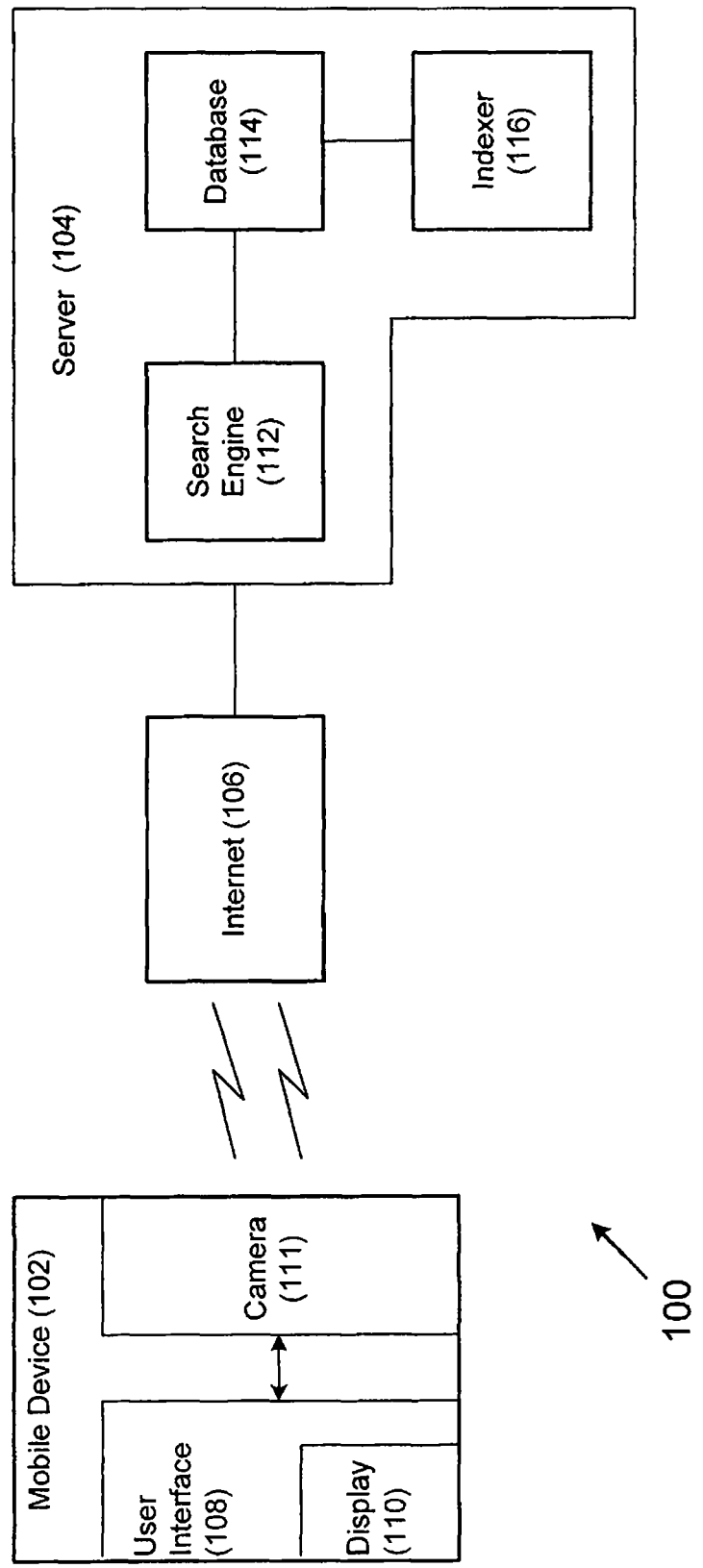
FIG. 1 is a block diagram of one embodiment of a search engine arrangement of the present invention.

In one embodiment, the invention may be applied to a search engine that may search for images of two or more dimensions. One specific embodiment of a search engine arrangement 100 of the present invention is illustrated in FIG. 1. Arrangement 100 includes a mobile electronic telecommunication device 102 in communication with a server 104 via the Internet 106. Device 102 may be a smartphone, similar to those marketed by Samsung Electronics Co., Ltd. (e.g., Galaxy) and Apple Inc. (e.g., iPhone), and may include a user interface 108 having a display 110 that displays images captured by a camera 111, as is well known. Server 104 may include a search engine 112, a database 114 and an indexer 116. Database 114 may store images, image data, and other data and information associated with a collection of component parts.

The information about the components parts stored in database 114 may include features that may be ascertained visually, or based on the appearance of the part, such as the type, size and/or shape of the part. However, the ascertainment of the visual features need not be performed by a human. Rather, indexer 116 may automatically analyze image data of the parts in order to categorize the part or determine their types. Techniques by which part image data may be automatically analyzed in order to categorize and organize the parts are disclosed in U.S. Patent Pub. No. 20030103673, entitled "Shape searcher", U.S. Patent Pub. No. 20100076959, entitled "METHODS FOR RETRIEVING SHAPES AND DRAWINGS", U.S. Patent Pub. No. 20060114252, entitled "Methods for retrieving shapes and drawings", U.S. Patent Pub. No. 20040249809, entitled "Methods, systems, and data structures for performing searches on three dimensional objects", and U.S. Patent Pub. No. 20030103089, entitled "Systems and methods for collaborative shape design", the disclosures of which are incorporated by reference herein in their entireties.

Indexing engine 116 may extract shape signatures from sets of files (e.g., sketches, images, 2D drawings and 3D models) which contain shape representations of parts or objects. Indexer 116 may then organize the files based on the visual family characteristics or rules defined for clustering or grouping of a set of visual attributes (e.g., geometry or shape) based on a similarity threshold. This visual information may then be used during a search. For example, when multiple images (e.g., multiple images of a same object captured by camera 111) are provided as input for a search, search engine 112 may match this shape input data against the visual family to obtain a match and may display a representative part/object from the visual family. Mobile device 102 communicates via internet 106 with server 104, where the indexed information is stored.

During use, a user of mobile device 102 may use camera 111 to capture multiple images of an object that the user would like engine 112 to search for in database 114. The multiple images may be taken from any angles, and do not necessarily have to be at right angles, i.e., do not necessarily have to be at orthogonal angles, relative to each other. All of the captured images of the same object may be entered into search engine 112 as a single search request. The multiple images included as search engine input may include at least two images, and there may be no upper limit on the number of images that may be used as input to a single search request.

If the object is resting on a surface when at least some of the images are captured, then the object may be lifted from the surface while one or more additional images of the object are captured from views that are generally in an upward direction. These additional images may also be used as input into the same search request as the previously captured images, which may have been from downward and/or lateral views.

Figure 2:
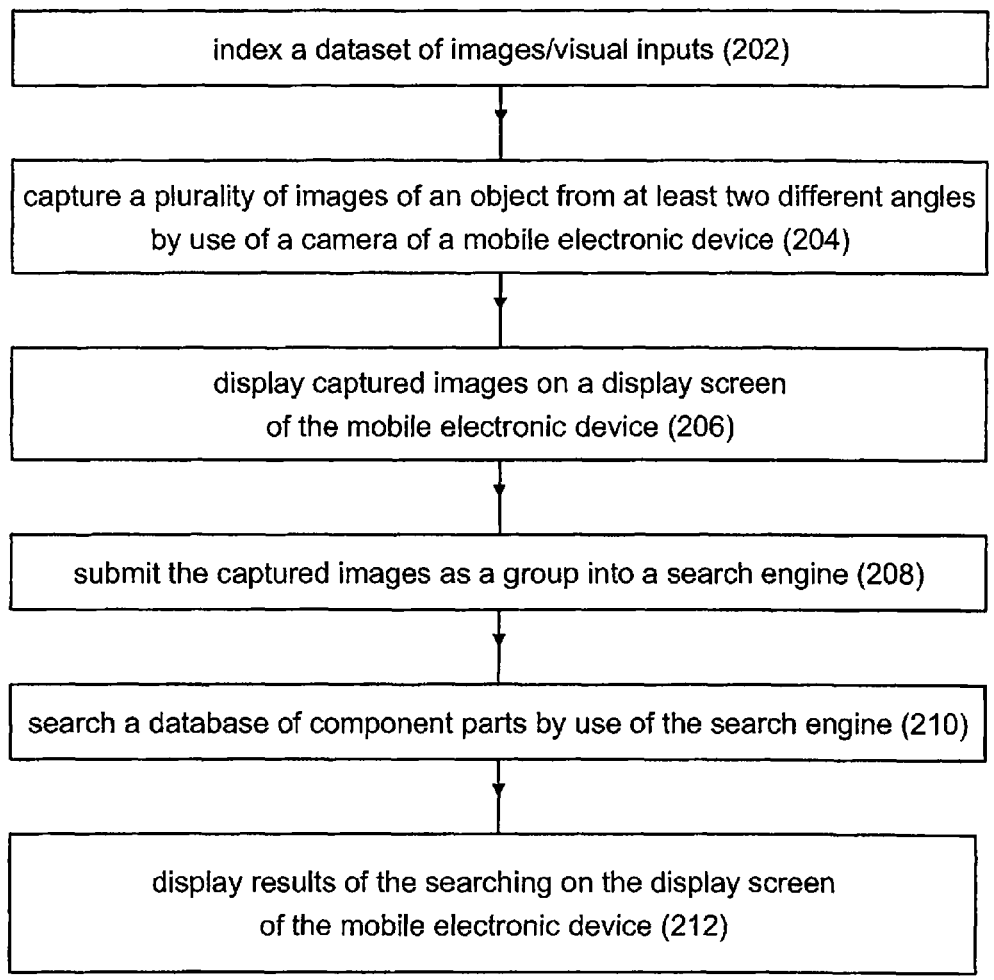
FIG. 2 is a flow chart of one embodiment of a search method of the present invention.

One embodiment of a search method 200 of the present invention is illustrated in FIG. 2. In a first step 202, a dataset of images/visual inputs are indexed. For example, the images/visual input may be indexed in database 114 using indexer 116.

In a second step 204, a plurality of images of an object are captured. The capturing is performed by use of a camera of a mobile electronic device. The images are captured from at least two different angles. For example, a user may use camera 111 of mobile device 102 to capture more than one image of an object, which may be a component part (e.g., a screw, a fastener, a plumbing elbow, a flange, etc.). The number of images captured may have no upper limit, but may typically be between ten and thirty in one embodiment. The user may move camera 111 to different viewpoints in order to capture each of the images.

In a third step 206, the captured images are displayed on a display screen of the mobile electronic device. For example, the images captured by camera 111 may be displayed on display screen 110 of user interface 108.

In a fourth step 208, the captured images are submitted as a group into a search engine. That is, each of the captured images may be entered into search engine 112 at the same time as the inputs to a single search of database 114 that may be performed by search engine 112.

In a fifth step 210, the database of component parts may be searched by use of the search engine. A result of the searching may be dependent upon each of the captured images in the submitted group. That is, search engine 112 may take into account each and every one of the images captured by camera 111 when selecting one or more component parts in database 114 that best match the object that is the subject of the captured images.

In a sixth step 212, the results of the searching are displayed on a display screen of the mobile electronic device. For example, the one or more component parts in database 114 that best match the object that is the subject of the captured images may be displayed on display screen 110 of user interface 108.

The term "active label" as used herein may encompass active RFID tags and similar technology. Although the active labels may be more simplistic, the inventor contemplates that active labels affixed to components of a system may include non-transitory computer memory, a power source (such as a micro solar panel or a battery), a WiFi antenna, a cellular antenna, or another radio frequency antenna. The computer memory of the active label may include detailed information about the product to which the active label is affixed. In one example, the active label includes detailed shape information about the product that allows the product to be indexed on a three dimensional search engine. Additionally, information located on the computer memory may include contact information for the manufacturer as well as other information that would assist a user in diagnosing or repairing the labelled part.

Figure 3:
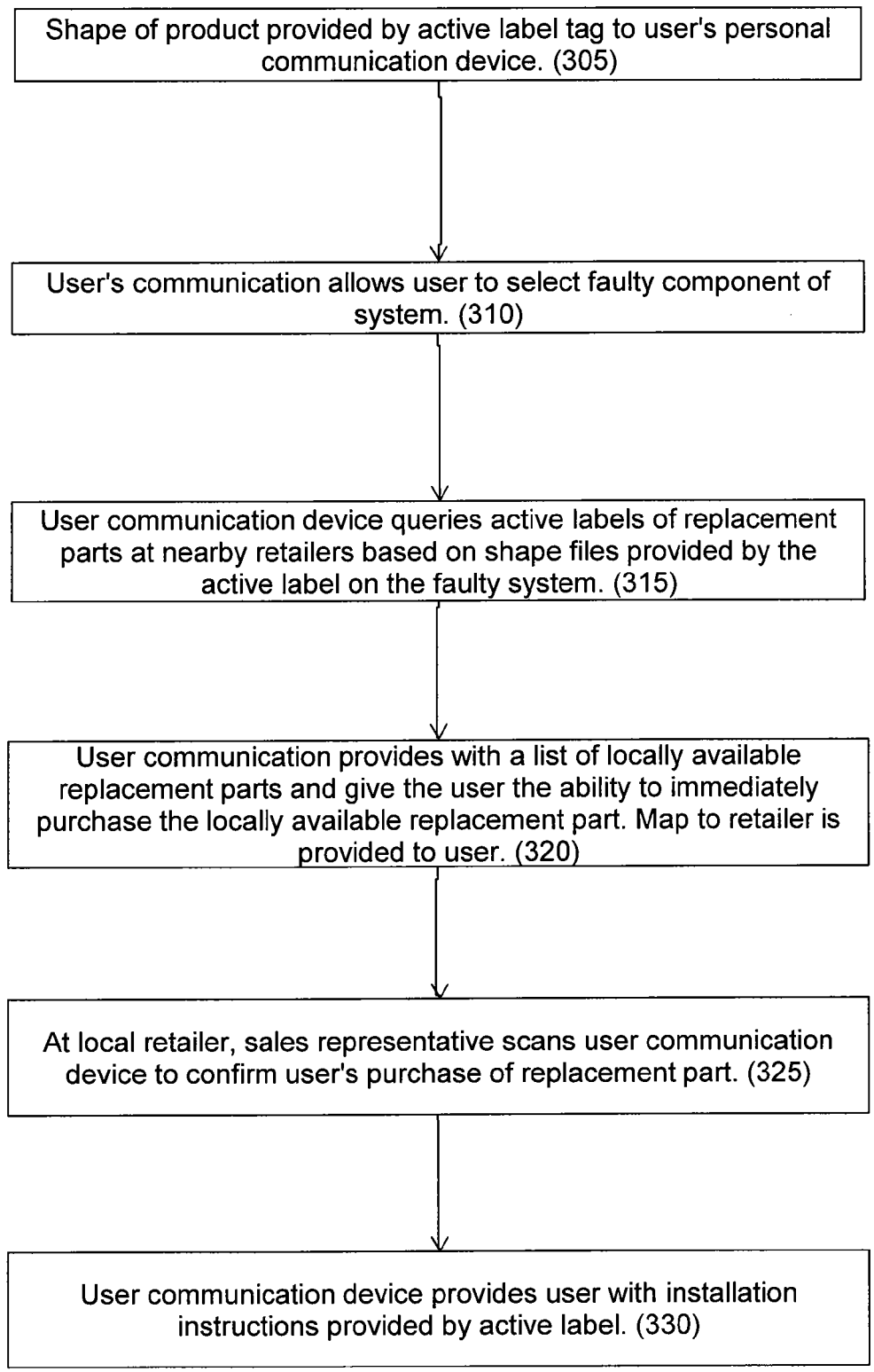
FIG. 3 is a flow chart illustrating an image search utilized to find a replacement part for a malfunctioning system that includes active labelled components.

FIG. 3 illustrates a flow chart of a user utilizing a user communication device to diagnose and repair a faulty system equipped with active labelled parts. In the example, the faulty system could be a relatively simple malfunctioning mechanical device, such as a leaky faucet or a residential circuit breaker. Alternatively, the faulty system could be a highly complex industrial process involving thousands of interconnected parts, such as the assembly process for an automobile.

In step 305, the user's communication device receives information about the system from an active label associated with an element of the system, the system, or a subsystem of the whole system. Although every individual component may have a unique active label, it should be appreciated that it is within the scope of the invention for a single active label to be used for multiple interrelated components. For example, it is expected that a faucet system could have a single active label that is capable of providing detailed information about all of the various components (washers, hoses, traps, valves, etc.) of the system, while in other instances each component may be labelled with an individual active label. With the user communication device (such as a smartphone) the user is able to read information from the active label associated and at step 305 the user receives shape files of the geometry of the components of the system.

At step 310, using the detailed information provided by the active label, the user is able to determine which of the components of the system is faulty. In addition to shape files, the active label may provide system disassembly instructions to aid the user in diagnosing the faulty system component. For example, if the user is diagnosing a faucet, the active label may suggest that if the faucet is leaking the user should carefully inspect the washers for cracks and other signs of wear. The active label may walk the user through the diagnosis of the faulty product. For example, if the user indicates that there is low water flow from the faucet, the programing on the active label may indicate that the user should inspect the hot and cold water valves below the faucet as well as the aerator for possible clogs or hard water buildup. Once the user has identified the problem component, the user selects the component on his user communication device. If the user communication device includes a touch screen, the selection of a specific component may be accomplished by selecting an image on the screen.

At step 315 the user communication device utilizes the shape files of the specific component to search for replacement components with matching geometry. While the user communication device may search retailers' websites and networks for acceptable components, in an exemplary embodiment of the invention the user communication device uses the shape files to ping nearby products equipped with active label at a local retailer without using a computer network operated by the local retailer. In the exemplary embodiment, the replacement parts located at the retailer are equipped with active labels and are able to provide their shape information to the user over an independent WiFi or cellular network upon a request from the user. Alternatively, the active labels may provide their shape information more directly to the user communication device via short range wireless signals received by a radio frequency (RFID) reader, which may be communicatively coupled to, or incorporated into, the user communication device.

U.S. Provisional Application 61/793,449 filed Mar. 15, 2013 (U.S. Pat. Pub. 20140222859) and U.S. patent application Ser. No. 13/758,344 filed Feb. 4, 2013 (U.S. Pat. Pub. 20130144758) provide information regarding the image search. The contents of those applications is herein incorporated by reference.

At step 320, the user communication device receives shape information back from nearby local parts equipped with active label. The boundary of which components are considered local may be based on a predetermined distance set by the user, or a specific set of network hubs that correspond to a geographic location, or a variety of other parameters. In the exemplary embodiment of the active labelled product providing information to the user communication device independent of a computer network operated by the retailer, the user communication device may use a geo-location search to match the location of the replacement component to the retailer that has the component in stock. Upon receiving responses from nearby active labels, the user communication device provides the user with a list of locations with the parts and may allow the user to immediately purchase the replacement part via a credit card or other funding source associated with the user communication device. In receiving information back from the network regarding the availability of the replacement part, the user communication device may perform a second verification step with the retailer's network to confirm that the product in their stores is available for purchase. For example, the user communication device may confirm with the retailer's computer network that the replacement component is still available for purchase. In the case of a product purchased on layaway, the active labelled product would still be located within the walls of the store, but would not still be available for purchase by another party.

If the user decides to purchase the item from a specific store, or if the user selects a store to purchase the item the user communication device may provide the user with a map to the store or the user communication device may be configured to provide turn by turn audible driving directions to the store.

At step 325, the user picks up the replacement item from the store. If the user has already paid for the item via the user communication device, the store may be equipped with a barcode or other scanner that queries the user communication device to verify the purchase. At the time of purchase, the user communication device may provide the user with information about the replacement part to help the user ensure that they are purchasing the correct replacement part. For example, the user communication device may indicate a particular color of packaging or display that is commonly associated with the item. In one case, a particular store labels all their 1½ inch pipe fittings with the color purple and the user communication device instructs the user to look for the color purple.

At step 330, the user has returned from the store with the replacement part and the active label on the system provides the user with instructions as to how to install the replacement part. In one embodiment, the active label provides the user with a video on how to replace the device, while in another embodiment the active label communicates with a wearable technology device on the user and guides the user through the installation process.

Figure 4:
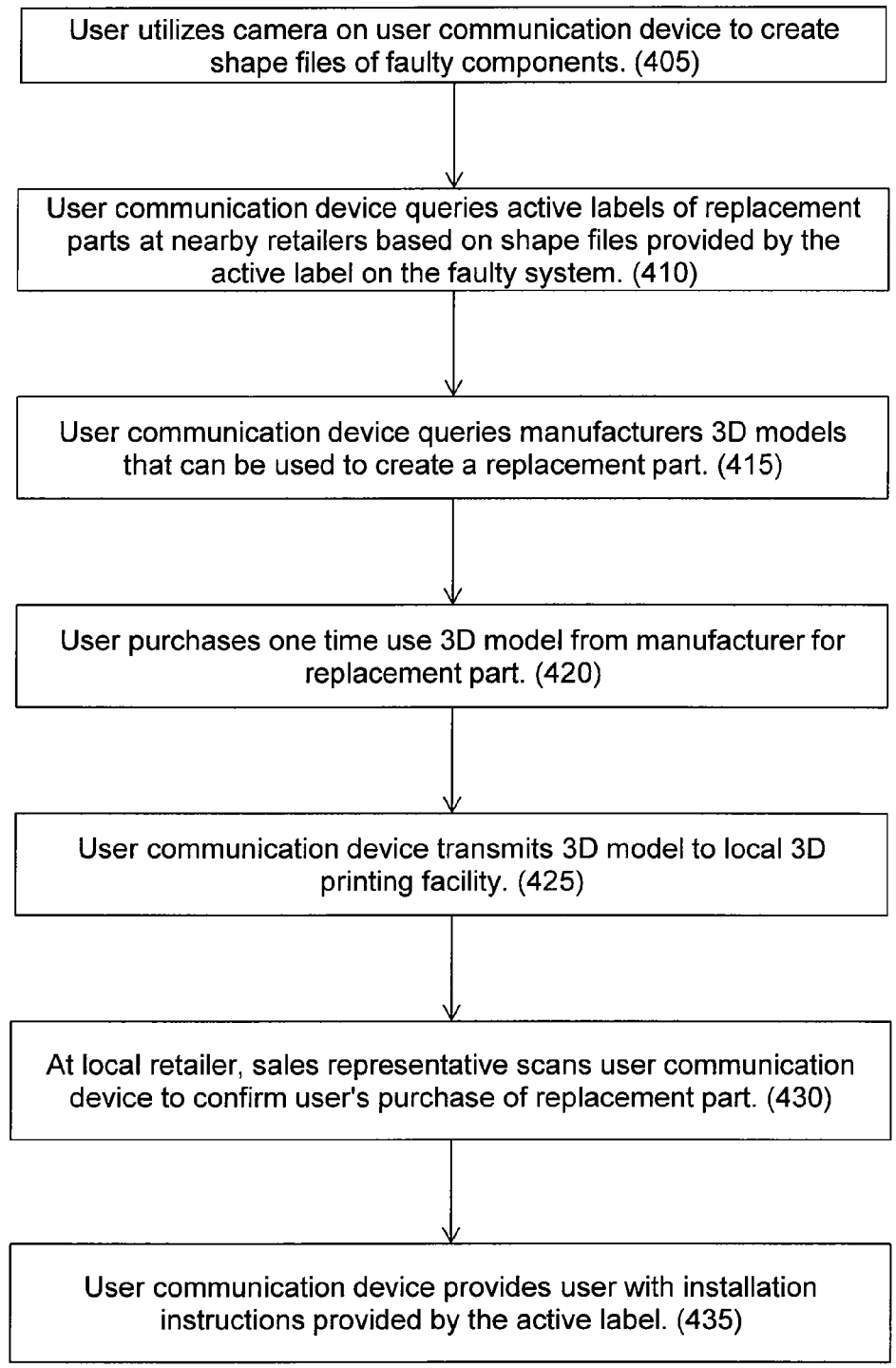
FIG. 4 is a flow chart illustrating an image search utilized to create a replacement part for a malfunctioning system that does not include active labelled components.

FIG. 4 illustrates an alternative process of a user utilizing an image search engine to search for a replacement for a part that is not equipped with active label. At step 405 the user utilizes the user communication device to create shape files of the faulty product. In an exemplary embodiment of the invention, the user communication device provides the user with walk through instructions on the series of photographs of the faulty component that should be taken. Once the user has taken the series of photographs, the user communication device processes the images to create a shape file of the component. Once the shape file has been created, at step 410 the user communication device queries locally available products for their shape files via the products' active label capabilities. The user communication device may then compare the photograph-based shape file to the local products' shape files in order to identify matching shapes. Step 410 may be substantially similar to step 315.

If there are no locally available active labelled products that are a suitable replacement for the faulty product, or the user does not wish to purchase the product from the one of the listed retailers, at step 415 the user communication device searches for manufacturers' 3D models that could be utilized to create a replacement part for the faulty component. It should be appreciated that while the process shown in FIG. 4 has the user communication device searching for locally available products before the user is given the option of having the part manufactured locally, in an alternate embodiment step 410 is skipped and the user is given the option of searching for manufacturers' 3D models without first searching for locally available products. In yet another embodiment, both the manufacturers' 3D models and the locally available products equipped with active label are searched simultaneously after the user communication device has created or obtained a shape file of the faulty system component. At step 420, the user communication device allows the user to immediately purchase and download the 3D model from the manufacturer using a credit card or other funding source associated with the user communication device. In an exemplary embodiment, the 3D model downloaded from the manufacturer includes a one-time use key that allows the 3D model to be used only a single time to generate the replacement part from a 3D printer.

While the user printing the replacement part at a home based printer is within the scope of the invention, at step 425 the user communication device transmits the 3D model and payment information to a local 3D printing facility so that production of the replacement part may begin before the user arrives at the 3D printing facility. In another embodiment of the invention, the 3D model is transmitted directly from the manufacturer to the printing facility. The manufacturers may limit the facilities that are allowed to print the manufacturers' products in order to enable the manufacturers to maintain a degree of quality control while limiting the opportunities for the models to be pirated. As with step 320, when the user is informed of the manufacturing location of the replacement part, the user communication device may provide a map to the user that gives directions on how to get to the small scale production facility. Steps 430 and 435 may be substantially similar to steps 325 and 330, respectively.

Figure 5:
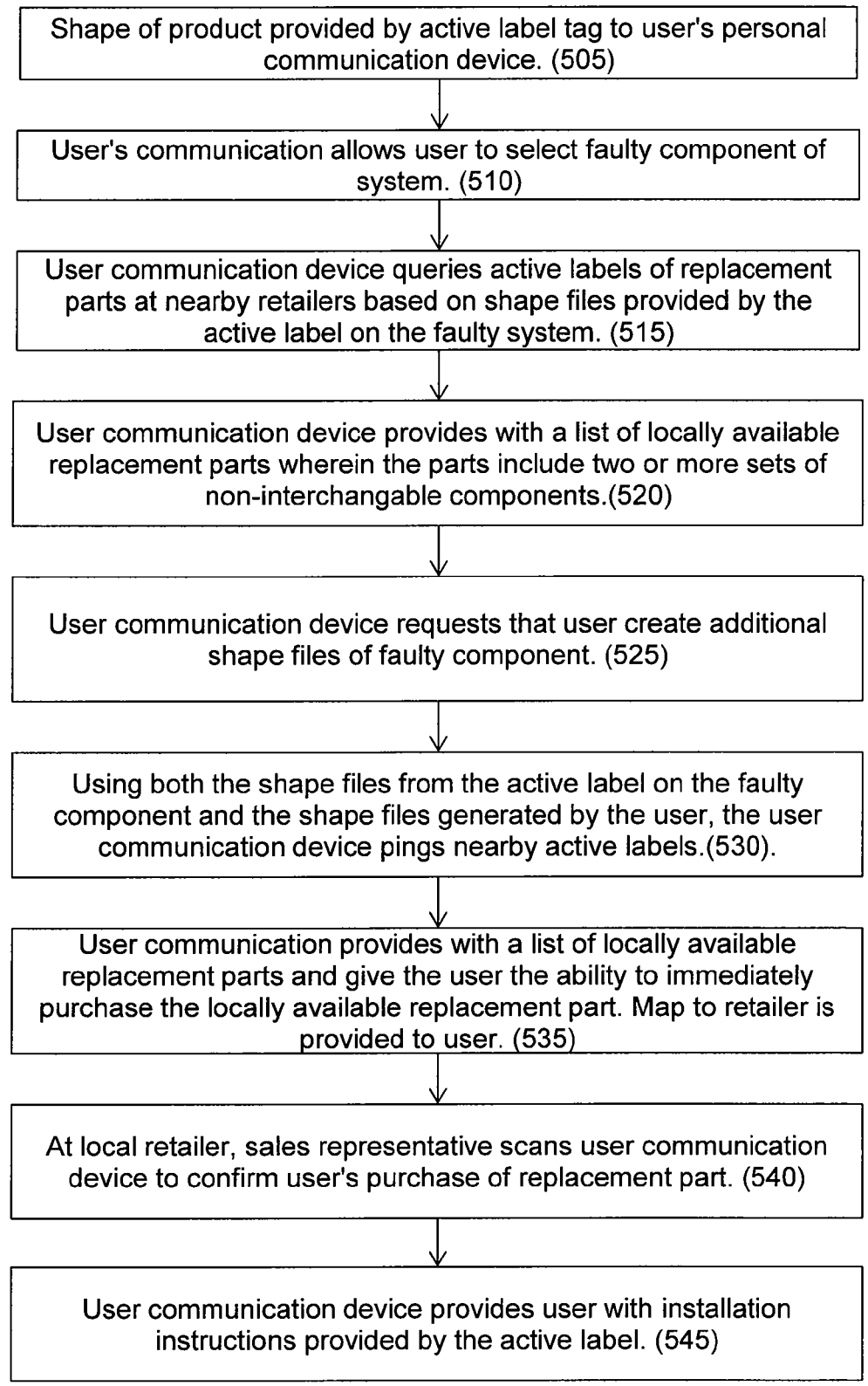
FIG. 5 is flow chart illustrating an image search for a replacement part for a faulty component wherein the component is equipped with an active label, but the shape file in the active label is insufficient to select from currently available replacement parts.

FIG. 5 illustrates a search process for a replacement part wherein a user communication device performs a first shape file search based on information provided by an active label associated with a faulty system and a second shape file search based on shape files provided from both the active label and photographs provided by the user. Steps 505, 510, and 515 may be substantially similar to steps 305, 310, and 315, respectively. Step 520 may be similar to step 320 except that the user communication device receives back shape files from two or more sets of non-interchangeable components equipped with active labels. At step 525, the user communication device requests that the user utilize a camera on the user communication device to obtain photographs of the faulty component. The process of a user creating shape files is described in step 405. At step 530, the user communication device uses both the shape files provided by the active label on the faulty component as well as the photographs provided by the user to ping local replacement component parts. Using the two shape files, the user communication device is able to refine the search such that only the optimal replacement parts are shown to the user. Steps 535 through 545 may be substantially similar to steps 320 through 330, respectively.

In the method described above with reference to FIG. 3, the user communication device may independently ascertain the nearby presence of a desired replacement part by sensing the replacement part's active label. Alternatively, or in addition, the user communication device may receive information from a retailer's computer network that is indicative of whether the desired replacement part is available for sale, regardless of whether the user communication device sensed the local presence of the replacement part via the part's active label. In another embodiment, described in detail below with reference to FIG. 6, multiple user communication device form a community and mutually share the information they individually gather from various parts' active labels within a same geographic area that may be selected or defined by each user. Thus, a retail parts inventory database may be created with shared part information that has been detected by each user communication device in the community and uploaded to a community parts database. Thus, a user may determine which parts are available at each local retailer without having to physically visit each retailer in order to detect what parts are on the premises from the parts' active labels.

Figure 6:
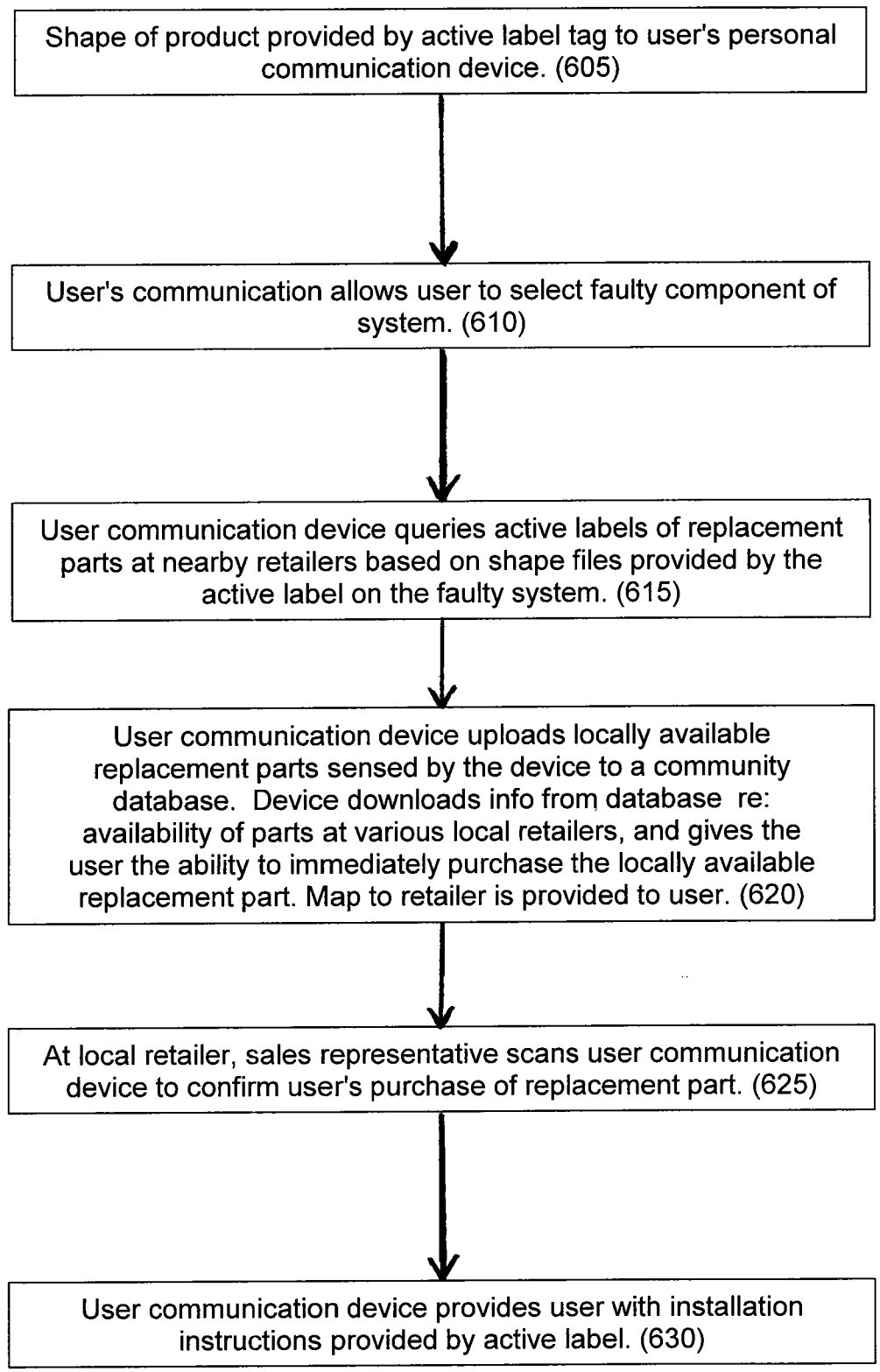
FIG. 6 is a flow chart illustrating one embodiment of a method of image searching for a replacement part using community inventory data collected and uploaded by a group of individual users' communication devices.

FIG. 6 illustrates a flow chart of another embodiment of a method in which a user utilizes a user communication device to diagnose and repair a faulty system equipped with active labelled parts. The user may use his communication device for image searching for a replacement part using community inventory data collected and uploaded by a group of individual users' communication devices. In the example, the faulty system could be a relatively simple malfunctioning mechanical device, such as a leaky faucet or a toilet. Alternatively, the faulty system could be a highly complex apparatus including thousands of interconnected parts, such as an automobile.

In step 605, the user's communication device receives information about the system from an active label associated with an element of the system, the system, or a subsystem of the whole system. Although every individual component may have a unique active label, it should be appreciated that it is also within the scope of the invention for a single active label to be used for multiple interrelated components. For example, a faucet system could have a single active label that is capable of providing detailed information about all of the various components (washers, hoses, traps, valves, etc.) of the system, while in other instances each component may be labelled with an individual active label. With the user communication device (such as a smartphone) the user is able to read information from the associated active label and at step 605 the user receives shape files of the geometry of the components of the system.

At step 610, using the detailed information provided by the active label, the user is able to determine which of the components of the system is faulty. In addition to shape files, the active label may provide system disassembly instructions to aid the user in diagnosing the faulty system component. For example, if the user is diagnosing a toilet, the active label may suggest that if the toilet won't stop running water after flushing, the user should carefully inspect the flapper and connected chain for signs of the flapper not seating or sealing the tank's water outlet. The active label may walk the user through the diagnosis of the faulty product. For example, if the user indicates that the toilet won't stop running, the programming on the active label may indicate that the user should inspect the flapper and chain as well as their freedom of movement for signs that the flapper does not properly seat on and seal the tank water outlet after the toilet is flushed. Once the user has identified the problematic component, the user may select the component on his user communication device. If the user communication device includes a touch screen, the selection of a specific faulty component may be accomplished by the user touching an image of the component on the screen.

At step 615 the user communication device utilizes the shape files of the specific component to search for replacement components with matching geometry. While the user communication device may search community databases, retailers' websites and networks for acceptable components, in one embodiment the user communication device uses the shape files to ping nearby products equipped with active labels at a local retailer without using a computer network operated by the local retailer. In this embodiment, the replacement parts located at the retailer may be equipped with active labels and may be able to provide their shape information to the user over an independent WiFi or cellular network upon a request from the user. Alternatively, the active labels may provide their shape information more directly to the user communication device via short range wireless signals received by a radio frequency (RFID) reader, which may be communicatively coupled to, or incorporated into, the user communication device.

At step 620, the user communication device receives shape information back from nearby local parts equipped with active label. The boundary of which components are considered local may be based on a predetermined distance set by the user, or a specific set of network hubs that correspond to a geographic location, or a variety of other parameters. In the exemplary embodiment of the active labelled product providing information to the user communication device independent of a computer network operated by the retailer, the user communication device may use a geo-location search to match the location of the replacement component to the retailer that has the component in stock. Upon receiving responses from nearby active labels, the user communication device provides the user with a list of locations with the parts and may allow the user to immediately purchase the replacement part via a credit card or other funding source associated with the user communication device.

All the users within a community, such as users within a limited or drivable geographic area (e.g., a city or town) may pool their collective data into a community database that may be used by each member of the community. For example, User 1 may be within the active label communication range of the items in Store A; User 2 may be within the active label communication range of the items in Store B; and User 3 may be within the active label communication range of the items in Store C. These three users may each upload into a community database the respective retailer component data that the users are within range to receive. Thus, each of Users A-C may take advantage of the retailer component data that the other two users are able to collect and upload to the community database. For example, although User 1 may not find the component he seeks in Store A, he may determine by referencing the database that the component he seeks is in Store B and/or Store C. The data uploaded to the community database may be time-stamped such that a user may determine which data about a particular store is more recent. The user may also use the time-stamp information in judging the likelihood of the data being inaccurate due to changed circumstances at the store since the data was uploaded. It is also possible for more recent data about a particular retailer to overwrite older data about the store in the community database. Thus, user/customers can access component data associated with a particular retailer without having to physically visit that particular retailer.

After receiving information back directly from the active labels and from the community database regarding the availability of the replacement part at particular retail outlets, the user communication device may perform a second verification step with the retailer's network to confirm that the product in their stores is available for purchase. For example, the user communication device may confirm with the retailer's computer network that the replacement component is still available for purchase. This may be particularly useful, for example, in the case of a product purchased on layaway or a demonstration product, wherein the active labelled product is located within the walls of the store, and thus is sensed by the communication devices of the users in the community, but yet the product is not available for purchase by another party.

If the user decides to purchase the item from a specific store, or if the user selects a store from which to purchase the item, the user communication device may provide the user with a map to the store or the user communication device may provide turn-by-turn audible driving directions to the store.

At step 625, the user picks up the replacement item from the store. If the user has already paid for the item via the user communication device, the store may be equipped with a barcode or other scanner that queries the user communication device to verify the purchase. At the time of purchase, the user communication device may provide the user with information about the replacement part to help the user find the replacement part in the store and/or ensure that the user is purchasing the correct replacement part. For example, the user communication device may indicate a particular location or aisle within the store where the replacement item may typically be found. In one case, a particular store displays and/or makes available all of their toilet flappers in aisle 14, and the user communication device instructs the user to go to aisle 14 to find the flapper.

At step 630, the user has returned to the location of the faulty system with the replacement part and the active label on the system provides the user with instructions as to how to install the replacement part. In one embodiment, the active label provides the user with a video on how to replace the part, while in another embodiment the active label communicates with a wearable electronic communication device on the user and guides the user through the installation process.

Figure 7:
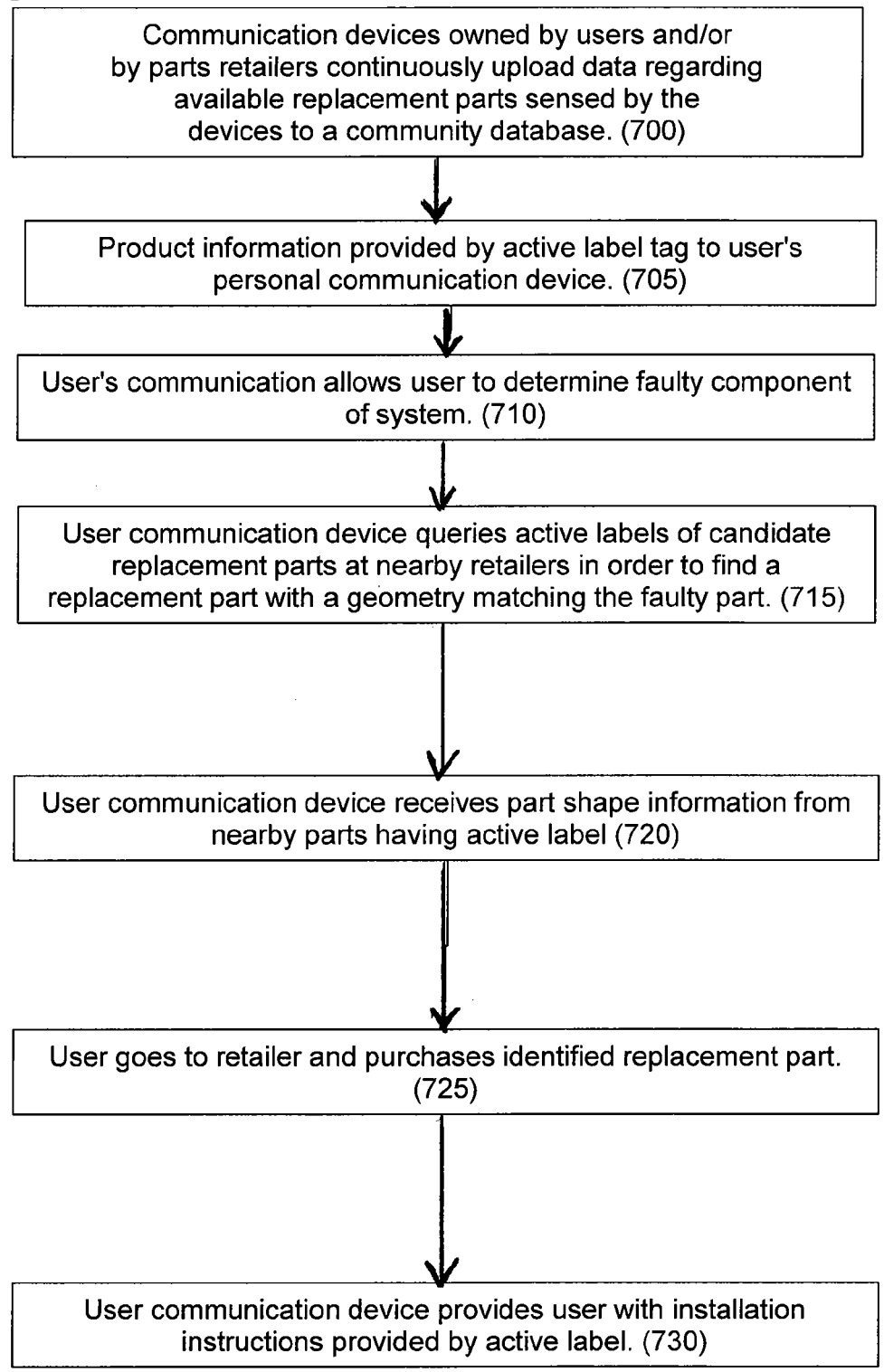
FIG. 7 is a flow chart illustrating another embodiment of a method of image searching for a replacement part using community inventory data collected and uploaded by a group of individual users' communication devices and/or by retailers of replacement parts.

FIG. 7 is a flow chart illustrating another embodiment of a method in which a user utilizes a user communication device to diagnose and repair a faulty system equipped with active labelled parts. The user may use his communication device for image searching for a replacement part using community inventory data collected and uploaded by a group of individual users' communication devices, or by retailers of replacement parts. In the example, the faulty system could be a relatively simple malfunctioning mechanical device, such as a leaky faucet or a residential circuit breaker. Alternatively, the faulty system could be a highly complex apparatus including many interconnected parts, such as a refrigerator.

In step 700, communication devices owned by users and/or by parts retailers continuously upload data regarding available replacement parts sensed by the devices to a community database. For example, all users who agree to it may have their communication devices (e.g., cell phones) linked to the community database. The users' cell phones may continuously receive and upload to the community database data from the active labels of nearby parts in nearby retail stores as the users travel around carrying their cell phones. The cell phones may collect any parts data that is within range, and this collected data may not be limited to parts that the user himself is interested in obtaining. In order to avoid the devices collecting data from parts that are in nearby businesses or residences, and that are no longer available for purchase, it may be standard practice for parts' active labels to be automatically disabled by the retailer at the point of purchase. The devices may collect and upload this data regarding nearby parts whenever the device is not busy with its primary functions of exchanging voice and data messages with other devices, for example. Instead of, or in addition to, user communication devices collecting and uploading data to the community database, retailers themselves may provide communication devices in their stores for continuously updating the parts data in the community database. Such communication devices may be wired or wireless. The retailer communication devices may wirelessly ping the parts within the retail outlet in order to receive updated part inventory and part shape information, or the data may be input directly into the retailer communication devices from a computerized inventory system in a wireless or wired manner without any querying being required by the retailer communication devices.

In step 705, the user's communication device receives information about the faulty system that the user wants to repair from an active label associated with an element of the system, the system, or a subsystem of the whole system. Although every individual component may have a unique active label, it should be appreciated that it is also within the scope of the invention for a single active label to be used for multiple interrelated components. For example, a vacuum cleaner could have a single active label that is capable of providing detailed information about all of the various components (hoses, motor, brush roller belt, filters, etc.) of the vacuum cleaner, while in other instances each component may be labelled with an individual active label. With the user communication device (such as a smartphone) the user is able to read information from the associated active label and at step 705 the user receives shape files of the geometry of the components of the system.

At step 710, using the detailed information provided by the active label, the user is able to determine which of the components of the system is faulty. In addition to shape files, the active label may provide system disassembly instructions to aid the user in diagnosing the faulty system component. For example, if the user is diagnosing a vacuum cleaner, the active label may suggest that if the vacuum cleaner won't pick up dirt, the user should carefully inspect the bag to make sure it is not full, inspect the filters to make sure they are not excessively dirty, and check the brush roller and belt to make sure that the roller rotates when the vacuum cleaner is operating. The active label may walk the user through the diagnosis of the faulty product. For example, if the user indicates that the vacuum cleaner won't pick up dirt, the programming on the active label may indicate that the user should inspect the bag, filters and brush roller belt to ensure that they are in a condition to enable the vacuum cleaner to operate properly. Once the user has identified the problematic component, the user may select the component on his user communication device. If the user communication device includes a touch screen, the selection of a specific faulty component may be accomplished by the user touching an image of the component on the screen.

At step 715 the user communication device utilizes the shape files of the specific component to search for replacement components with matching geometry. While the user communication device may search community databases, retailers' websites and networks for acceptable components, in one embodiment the user communication device uses the shape files to ping nearby products equipped with active labels at a local retailer without using a computer network operated by the local retailer. The user may use his communication device to check the community database to determine where (e.g., at what retail outlets) candidate replacement parts are located. The user may then go to (e.g., physically visit) the determined locations in order that his communication device may ping the parts at the location, and so that the user may physically take possession of (e.g., purchase) the replacement part that is ultimately determined to be acceptable. In this embodiment, the replacement parts located at the retailer may be equipped with active labels and may be able to provide their shape information to the user over an independent WiFi or cellular network upon a request from the user. Alternatively, the active labels may provide their shape information more directly to the user communication device via short range wireless signals received by a radio frequency (RFID) reader, which may be communicatively coupled to, or incorporated into, the user communication device.

At step 720, the user communication device receives shape information back from nearby local parts equipped with active label. The boundary of which components are considered local may be based on a predetermined distance set by the user, or a specific set of network hubs that correspond to a geographic location, or a variety of other parameters. In the exemplary embodiment of the active labelled product providing information to the user communication device independent of a computer network operated by the retailer, the user communication device may use a geo-location search to match the location of the replacement component to the retailer that has the component in stock. Upon receiving responses from nearby active labels, the user communication device provides the user with a list of locations with the parts and may enable the user to immediately purchase the replacement part via a credit card or other funding source associated with the user communication device.

All the users within a community, such as users within a limited or drivable geographic area (e.g., a city or town) may pool their collective data into a community database that may be used by each member of the community. For example, User 1 may be within the active label communication range of the items in Store A; User 2 may be within the active label communication range of the items in Store B; and User 3 may be within the active label communication range of the items in Store C. These three users may each upload into a community database the respective retailer component data that the users are within range to receive. Thus, each of Users A-C may take advantage of the retailer component data that the other two users are able to collect and upload to the community database. For example, although User 1 may not find the component he seeks in Store A, he may determine by referencing the database that the component he seeks is in Store B and/or Store C. The data uploaded to the community database may be time-stamped such that a user may determine which data about a particular store is more recent. The user may also use the time-stamp information in judging the likelihood of the data being inaccurate due to changed circumstances at the store since the data was uploaded. It is also possible for more recent data about a particular retailer to overwrite older data about the store in the community database. Thus, user/customers can access component data associated with a particular retailer without having to physically visit that particular retailer.

In addition to the data contributed to the community database by individual users, retail establishments such as Stores A, B and C may upload their own retailer component data, which may or may not be time-stamped, to the community database so that the retailer-supplied data may be accessed and searched by individual users. The retailer component data that is contributed to the community database by the retailers may include additional data that may not be received by the user communication devices in response to pinging, but that may be retrieved by the user communication devices from the community database. Such additional data may include, for example, retail price, location within the retail outlet (e.g., aisle number), the quantity of that particular part in stock at the retail outlet, color, instructions, hours that the store is open, etc.

After receiving information back directly from the active labels and from the community database regarding the availability of the replacement part at particular retail outlets, the user communication device may perform a second verification step with the retailer's network to confirm that the product in their stores is still available for purchase. For example, the user communication device may confirm with the retailer's computer network that the replacement component is still available for purchase at that particular instant in time. This may be particularly useful, for example, in the case of a product purchased on layaway or a demonstration product, wherein the active labelled product is located within the walls of the store, and thus is sensed by the communication devices of the users in the community, but yet the product is not available for purchase by another party. This may also be particularly useful in the case of a product that was earlier sensed by a user communication device, but that has since been purchased by another individual, and thus is no longer available for purchase by any other individual.

If the user decides to purchase the item from a specific retail outlet, or if the user selects a retail outlet from which to purchase the item, the user communication device may provide the user with a map to the store or the user communication device may provide turn-by-turn audible driving directions to the store in addition to any of the information associated with the item that is stored in the database.

At step 725, the user picks up the replacement item from the store. If the user has already paid for the item via the user communication device, the store may be equipped with a barcode or other scanner that queries the user communication device to verify the purchase. At the time of purchase, the user communication device may provide the user with information about the replacement part to help the user find the replacement part in the store and/or ensure that the user is purchasing the correct replacement part. For example, the user communication device may indicate a particular location or aisle within the store where the replacement item may typically be found. In one case, a particular store displays and/or makes available all of their vacuum cleaner belts on the second floor of the store, and the user communication device instructs the user to go to second floor to find the belt. The user communication device may also provide the user with a photograph of the product packaging so that the user may more quickly recognize the belt packing on the shelf and find the particular belt that he is looking for. The product packaging photograph may be downloaded to the user communication device from the community database, or may be retrieved by the user communication device from the part's active label.

At step 730, the user has returned to the location of the faulty system with the replacement part and the active label on the system provides the user with instructions as to how to install the replacement part. In one embodiment, the active label provides the user with a video on how to replace the part, or an internet link to such a video. In another embodiment the active label communicates with a wearable electronic communication device on the user and guides the user through the installation process.

It should be understood that the programs, processes, methods and system described herein are not related or limited to any particular type components unless indicated otherwise. Various combinations of general purpose, specialized or equivalent components may be used with or perform operations in accordance with the teachings described herein.

While this invention has been described as having an exemplary design, the present invention may be further modified within the spirit and scope of this disclosure. This application is therefore intended to cover any variations, uses, or adaptations of the invention using its general principles.

What is claimed is:

1. A method of enabling a user to procure a replacement component part to replace a faulty component part, comprising:
   wirelessly receiving shape information at the user's electronic communication device, the shape information being transmitted from an active label associated with the faulty component part, the shape information being indicative of a physical shape of the faulty component part;
   displaying an image indicative of the shape information on the communication device;
   using the communication device to query active labels of candidate replacement component parts, the querying being dependent upon the shape information; and
   wirelessly receiving replacement component part information at the user's electronic communication device, the replacement component part information being transmitted from an active label associated with the one of the candidate replacement component parts that matches the shape information, the replacement component part information being indicative of how the user may procure the one of the candidate replacement component parts that matches the shape information.

2. The method of claim 1 comprising the further step of enabling the user to select the shape information associated with the faulty component part from shape information associated with all of the component parts of a system including the faulty component part.

3. The method of claim 1 wherein the replacement component part information is indicative of a geographical location at which the candidate replacement component part that matches the shape information may be obtained.

4. The method of claim 1 wherein the replacement component part information is indicative of a physical shape of the candidate replacement component part that matches the shape information.

5. The method of claim 1 wherein the communication device queries the active labels of candidate replacement component parts directly without any intermediary.

6. The method of claim 1 further comprising wirelessly receiving installation information at the user's electronic communication device, the installation information being transmitted from the active label associated with the faulty component part, the installation information being indicative of how to install the replacement component part.

7. The method of claim 1 wherein the communication device queries the active labels of candidate replacement component parts wirelessly.

8. A method of providing a user with information about a replacement component part to replace a faulty component part of a system, comprising:
wirelessly receiving part information at the user's electronic communication device, the part information being transmitted from an active label associated with the system, the part information being indicative of a plurality of component parts of the system;
displaying an image indicative of the part information on the communication device;
enabling the user to select a portion of the displayed part information that is associated with the faulty component part;
using the communication device to wirelessly query active labels of candidate replacement component parts for part information associated with the candidate replacement component parts;
wirelessly receiving at the communication device the part information associated with the candidate replacement component parts and location information associated with the candidate replacement component parts;
uploading the part information and the location information associated with the candidate replacement component parts from the communication device to a community database; and
using the communication device to search the community database for part information and location information associated with candidate replacement component parts, at least a portion of the part information and location information in the community database not being contributed by the communication device.

9. The method of claim 8 wherein the part information comprises shape information indicative of physical shapes of the component parts.

10. The method of claim 8 further comprising using the communication device to select and purchase one of the candidate replacement component parts in the community database.

11. The method of claim 8 wherein the uploading of the part information and the searching of the community database are performed wirelessly.

12. The method of claim 8 wherein the communication device wirelessly queries active labels of candidate replacement component parts for part information associated with the candidate replacement component parts dependent upon the selected portion of the displayed part information that is associated with the faulty component part.

13. The method of claim 8 wherein the portion of the part information and location information in the community database not contributed by the communication device is contributed to the community database by wireless electronic communication devices associated with respective retail outlets.

14. The method of claim 13 wherein the portion of the part information and location information in the community database contributed to the community database by wireless electronic communication devices associated with respective retail outlets comprises a first portion, a second portion of the part information and location information in the community database not contributed by the user's communication device being contributed to the community database by electronic communication devices of other users.

* * * * *